US012570397B2

(12) United States Patent
S R et al.

(10) Patent No.: US 12,570,397 B2
(45) Date of Patent: Mar. 10, 2026

(54) LIFT ENHANCEMENT ASSEMBLY OF AN AERIAL VEHICLE WITH FIXED WINGS

(71) Applicant: UBIFLY TECHNOLOGIES PRIVATE LIMITED, Chennai (IN)

(72) Inventors: Chakravarthy S R, Chennai (IN); Omkar Narendra Walvekar, Nashik (IN); Gowdham R, Chennai (IN); Sree Raghav R, Palakkad (IN); Ramprakash Ravichandran, Bangalore (IN)

(73) Assignee: UBIFLY TECHNOLOGIES PRIVATE LIMITED, Chennai (IN)

( * ) Notice: Subject to any disclaimer, the term of this patent is extended or adjusted under 35 U.S.C. 154(b) by 0 days.

(21) Appl. No.: 17/638,371

(22) PCT Filed: Jul. 25, 2020

(86) PCT No.: PCT/IN2020/050644
§ 371 (c)(1),
(2) Date: Feb. 25, 2022

(87) PCT Pub. No.: WO2021/019556
PCT Pub. Date: Feb. 4, 2021

(65) Prior Publication Data
US 2022/0297829 A1 Sep. 22, 2022

(30) Foreign Application Priority Data
Jul. 26, 2019 (IN) .............................. 201941030390

(51) Int. Cl.
B64C 27/26 (2006.01)
B64C 3/42 (2006.01)
(Continued)

(52) U.S. Cl.
CPC ................ B64C 27/26 (2013.01); B64C 3/42 (2013.01); B64C 9/24 (2013.01); B64C 9/38 (2013.01); B64C 29/0016 (2013.01)

(58) Field of Classification Search
CPC .. B64C 27/26; B64C 3/42; B64C 9/24; B64C 9/38; B64C 29/0016; B64C 29/0025
See application file for complete search history.

(56) References Cited

U.S. PATENT DOCUMENTS 2,389,798 A * 11/1945 Main ....................... B64C 27/54
244/6
3,179,354 A * 4/1965 Alvarez-Calderon .......................
B64C 23/08
244/206

(Continued)

FOREIGN PATENT DOCUMENTS

CN 108190017 A 6/2018

OTHER PUBLICATIONS

International Search Report dated Nov. 7, 2020 issued in corresponding PCT/IN2020/050644 application (3 pages).

(Continued)

*Primary Examiner* — Richard Green
*Assistant Examiner* — Nevena Aleksic
(74) *Attorney, Agent, or Firm* — Christopher B. Kilner; MILLEN, WHITE, ZELANO & BRANIGAN

(57) ABSTRACT
Present invention relates to a lift assembly (300) in an aerial vehicle. The lift assembly (300) comprises a wing (102) and at least a vertical rotor (118) disposed below the wing (102). A vertical axis (121) of the vertical rotor (118) is positioned within a wing span of the wing (102). The vertical rotor (118) is operational during forward flight of the aerial vehicle. A placement distance (122) between the leading edge (108) and the vertical axis (121) of the vertical rotor (118) is a factor of RPM of the rotor (118), angle of attack
(Continued)

(116) of the wing, and a wing chord (117). The lift assembly (300) produces enhanced lift higher than the sum of lift produced by the wing (102) and the rotor (118) individually, which enables the provision of small wings and hence incur reduced drag.

2 Claims, 5 Drawing Sheets

(51) Int. Cl.
    *B64C 9/24*        (2006.01)
    *B64C 9/38*        (2006.01)
    *B64C 29/00*      (2006.01)

(56)              References Cited

U.S. PATENT DOCUMENTS

| | | | | |
|---|---|---|---|---|
| 4,789,115 | A * | 12/1988 | Koutsoupidis | B64C 27/26 |
| | | | | 244/6 |
| 5,244,167 | A * | 9/1993 | Turk | B64C 19/00 |
| | | | | 244/23 B |
| 9,334,049 | B1 * | 5/2016 | LeGrand, III | B64C 13/00 |
| 10,407,162 | B2 * | 9/2019 | Datta | B64U 30/296 |

OTHER PUBLICATIONS

International Search report PCT/IN2020/050644 dated Jul. 11, 2020 (pp. 1-3).

* cited by examiner

Figure 7
Figure 8
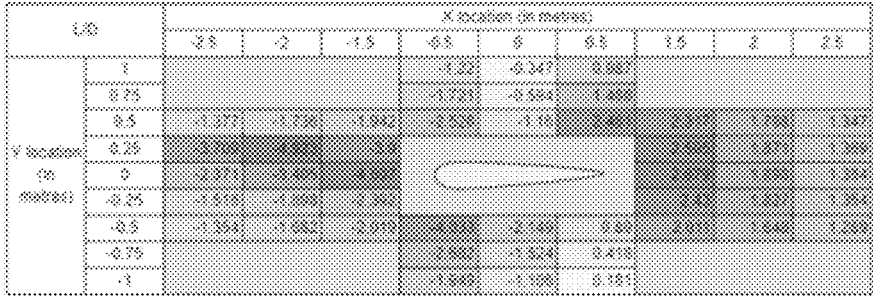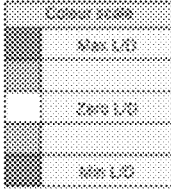
Figure 9

LIFT ENHANCEMENT ASSEMBLY OF AN AERIAL VEHICLE WITH FIXED WINGS

FIELD OF THE INVENTION

The present invention relates to an aerial vehicle. In particular, the present invention relates to a lift assembly in an aerial vehicle.

BACKGROUND

The dynamics of an aerial vehicle is governed by counteracting the drag and gravitational forces acting on the aerial vehicle. Lift forces serve to overcome the effect of gravity on the dynamics of the aerial vehicle. The lift forces are provided by fixed wings which are designed to create a pressure differential to generate lift force during forward flight. Alternatively, a rotary wing can produce lift force as in the case of rotorcrafts. During vertical takeoff, landing, or hovering in the air, a set of rotors may be used to produce lift. However, during forward flight, these rotors are idle and become deadweight as they do not provide lift.

CN103043212A discloses a composite aircraft composed of a fixed wing and an electric multi-rotor, comprising a set of electric multi-rotor power system and a total controller. The fixed wing power system and the electric multi-rotor power system are structurally independent from each other. The utility model comprises the fixed wing control system and an electric multi-rotor control system for controlling the operation of the electric multi-rotor power system. The total controller is further configured to control the fixed wing control system and the electric multi-rotor control system to work alone or cooperate. The rotor rotation plane of the electric multi-rotor power system is parallel to the center axis of the fuselage. The ability to freely switch between the two modes of flight, both for helicopter take-off and flight, for take-off and landing like a fixed-wing aircraft, or for the use of two powertrains during take-off and landing.

The lift coefficient ($C_L$) is a dimensionless coefficient that relates the lift generated by a lifting body to the fluid density around the body, the fluid velocity and an associated reference area. A lifting body is a foil or a complete foil-bearing body such as a fixed-wing aircraft. $C_L$ is a function of the shape of the body, the angle of the lifting body to the flow, its Reynolds number and its Mach number. The shape of the body is a major factor which determines the value of $C_L$ $C_L$ is a number that aerodynamicists use to model all of the complex dependencies of shape, inclination, and some flow conditions on lift.

The payload to be carried by an aerial vehicle and the desired speed of travel influence the required lift and the size and structure of wings. The wing structure in-turn influences the size of the aerial vehicle which dictates the scope of usage of the aerial vehicle. A compact, energy efficient system to create the necessary lift for an aerial vehicle will enable increasing the scope of usage and energy efficiency.

Efforts to increase the lift coefficient obtained from components or mechanisms which are used to generate lift are necessary for the efficient design of an aerial vehicle.

Given the significance of increasing lift coefficient in improving the scope of use and energy efficiency of an aerial vehicle, efforts to design systems which will achieve this objective are necessary. The payload carrying capacity and the endurance and range of the aerial vehicle can be improved.

OBJECTIVES OF THE INVENTION

The primary objective of the present invention is to provide an increase in lift coefficient in an aerial vehicle with fixed wings.

The secondary objective is to repurpose rotors which are idle during forward flight.

SUMMARY

The present invention relates to a lift assembly in an aerial vehicle. The lift assembly comprises a wing and at least a vertical rotor. The vertical rotor is disposed below the wing such that the vertical rotor is positioned within the span of the wing. The vertical rotor is operational during forward flight. Further, the vertical rotor is positioned away from the leading edge at a placement distance. The placement distance is the distance between the leading edge and the vertical axis of the vertical rotor. The placement distance is a factor of the RPM of the vertical rotor, the diameter of the vertical rotor, an angle of attack of the wing, and a chord of the wing. The lift assembly is designed to maximize lift.

The lift assembly produces enhanced lift which enables the provision of small wings and hence incur reduced drag. This enables the aerial vehicle to move at slower speeds and incur further reduced drag or enable carrying more pay-load at the same speed. The endurance and range of the aerial vehicle is increased.

These objectives and advantages of the present invention will become more evident from the following detailed description when taken in conjunction with the accompanying drawings.

BRIEF DESCRIPTION OF THE DRAWINGS

The objective of the present invention will now be described in more detail with reference to the accompanying drawing, wherein:

FIG. 7 is a table showing the lift, in N, produced as estimated by CFD simulations, with rotor positioned at various locations around the wing, at a given chord 1 m, operational RPM of the vertical rotor at 70% throttle and the angle of attack 0 degree in an embodiment of the present subject matter.

FIG. 8 is another table showing the drag gain as estimated by CFD simulations, with rotor positioned at various locations around the wing, at a given chord 1 m, operational RPM of the vertical rotor at 70% throttle and the angle of attack 0 degree in an embodiment of the present subject matter.

FIG. 9 is a further table showing the lift to drag gain ratio (L/D) as estimated by CFD simulations, with rotor positioned at various locations around the wing, at a given chord 1 m, operational RPM of the vertical rotor at 70% throttle and the angle of attack 0 degree in an embodiment of the present subject matter.

REFERENCE NUMERALS

Figure 1:
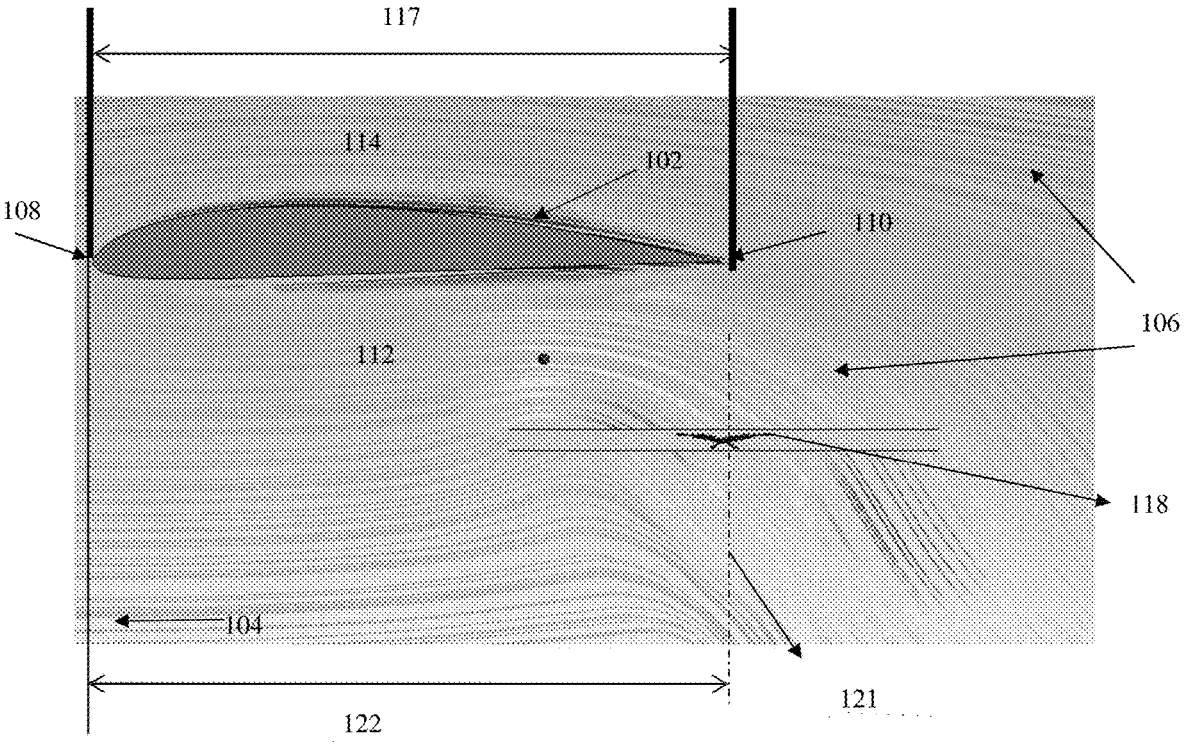
FIG. 1 illustrates the air flow in the presence of a fixed wing and an operational vertical rotor in an embodiment of the present subject matter.

Fixed wing 102
Direction of forward flight 104
Air flow 106
Leading edge 108
Trailing edge 110
Pressure side 112
Suction side 114
Angle of attack 116
Chord 117
Vertical rotor 118
Motor 119
Blades 120
Vertical axis 121
Placement distance 122
Connecting element 124
Lift assembly 300

DETAILED DESCRIPTION OF THE INVENTION

In an aerial vehicle with fixed wings, lift forces are generated by wings during forward flight. When air flows over the wings during forward flight, the shape and orientation of the wing generates a pressure field with a low pressure at the top of the wing known as a suction side and a high pressure below the wing known as a pressure side. The lift forces are produced as a result of the pressure field.

Further, vertical rotors are provided for usage during takeoff, landing and hovering. But during forward flight, the vertical rotors become dead weight. A lift assembly which utilizes the lift provided by operating vertical rotors during forward flight is developed in the present invention. The presence of the rotors and their operation alters the flow field and hence the pressure field around the wing FIG. 1 illustrates the air flow in the presence of a fixed wing and an operational vertical rotor in an embodiment of the present subject matter. A cross section of a fixed wing 102 is shown. The arrow 104 indicates the direction of forward flight. The air flow towards and around the fixed wing 102 is shown by the lines 106 indicating the air flow. The fixed wing 102 has a first end also termed as the leading edge 108 and a second end also termed as the trailing edge 110. A region of high pressure is created below the fixed wing 102 termed as a pressure side 112 and a region of low pressure is created above the fixed wing 102 termed as a suction side 114. A dotted line along the center of the fixed wing 102 makes an angle with the horizontal axis termed as angle of attack 116. The distance between the leading edge 108 and the trailing edge 110 is termed as chord 117. The chord 117 is given by a symbol c. A vertical rotor 118 is positioned below the fixed wing 102 and operated during the forward flight. A vertical axis 121 of the vertical rotor 118 is positioned around the wing span of the fixed wing 102 at the pressure side 112.

Figure 2:
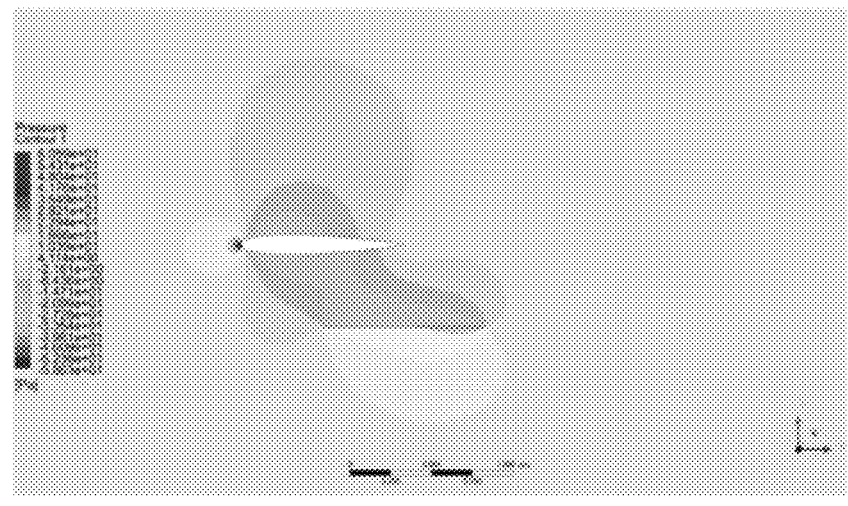
FIG. 2 illustrates the pressure distribution estimated by computational fluid dynamics (CFD) simulation in the flow field of a lift assembly in an embodiment of the present subject matter.

When the vertical rotor 118 is appropriately placed around the fixed wing 102, the altered air flow alters the pressure field in the pressure side 112 and suction side 114 so as to increase the lift forces. The horizontal distance between the leading edge 108 and the vertical axis 121 is termed as a placement distance 122. The placement distance 122 is given by a variable y. The ratio of the placement distance 122 and the chord 117, y/c is a non-dimensional variable given by a symbol p. When the vertical axis 121 is positioned at the leading edge 108, p is 0 and when the vertical axis 121 is positioned at the trailing edge 110, p is 1. FIG. 2 illustrates the pressure distribution estimated by computational fluid dynamics (CFD) simulation in the flow field of a lift assembly in an embodiment of the present subject matter. The interaction in the flow field between the wing and rotor is clearly seen in the CFD simulations done. The low-pressure region exists all over the suction side trailing till the rotor. This causes the whole system to produce a normal upward force in a synergistic manner.

The synergistic lift is produced by placing one or more rotors appropriately around the wing along the wingspan in such a manner that the overall upward pressure increases on the wing surface due to the operation of the rotor(s), thereby increasing the lift produced by the wing beyond the sum of lift produced by the wing and the rotor(s) individually.

The lift forces are quantified by the lift coefficient $C_L$ given by eq (1). The $C_L$ value is taken as a measure to estimate the effectiveness of the lift assembly.

$$C_L = \frac{L}{\frac{1}{2}\rho v^2 S} \tag{1}$$

The lift force produced by the lift assembly is given by L, the density of air is given by p, the velocity of air is given by v, and the planform area of the wing is given by S. The lift force L also serves as a measure to assess the effectiveness of the lift assembly.

To analyse this phenomenon, an experiment was conducted to determine the lift in a lifting assembly with a stationary rotor positioned at various distances from the leading edge. The same experiment was then conducted to determine the lift in the lifting assembly with the rotor running at an RPM varying from 500-6500 in steps of 500. The details of the experiment are as follows:

The experiment was conducted by placing a fixed wing over a flat mounting surface using supports at the wingtips, such that the angle of attack can be varied. The mounting surface was then placed on an electric weighing scale to determine the lift force generated. The vertical rotor was mounted on a stand such that its axis was normal to the mounting surface. An industrial fan was placed at a fixed distance from the leading edge of the wing and was used to create an incoming freestream over the setup by blowing air at a constant speed. The position of the rotor was varied across the chord of the wing, for varying RPM of the rotor and angle of attack of the wing. It was observed that increasing the angle of attack of the wing, for a given RPM, and position of the rotor, caused an increase in the lift coefficient. Placing the rotor farther downstream, at a given RPM of the rotor and angle of attack of the wing, caused an increase in the lift coefficient. A higher RPM of the rotor with a given rotor location and angle of attack of the wing resulted in an increased lift coefficient. Increasing the RPM of the rotor also caused an increased difference in the lift coefficient for different rotor positions and angles of attack of the wing. The airflow and the stall angle of the wing was altered considerably due to the presence of the rotor. The experiment was repeated for the same set of parameters with the industrial fan switched off and only the rotor being operated. The results obtained when the rotor was stationary and the industrial fan was on, was compared with the results obtained when the rotor was operated and the industrial fan was off. While the former gives the lift force generated by the wing individually, the latter gives the lift force generated by the rotor individually. The lift force generated at both these scenarios was summed up to give the sum of the lift coefficient of the two components operated individually. The lift coefficient estimated when both the rotor and the industrial fan was operated gives the combined effect of the wing and the rotor operating during forward flight. The comparison of experimental results successfully showed the synergy between a fixed wing and an operating rotor by providing a higher lift coefficient for the setup as compared to the sum of the lift coefficient of the two components operated individually.

The height of the rotor from the wing has been fixed for this experiment. The angle of attack (angle at which the airfoil is positioned) has also been varied.

The lift produced by the combination of fixed wing 102 and vertical rotor 118 was determined and compared with the sum of lift produced by the fixed wing 102 and vertical rotor 118 individually with the vertical rotor 118 positioned at different p values.

The ratio of the lift coefficient determined with the combination of fixed wing 102 and vertical rotor 118, $C_{L\,new}$, to the lift coefficient determined with sum of lift produced by the fixed wing 102 and vertical rotor 118 individually, $C_L$, measures the synergistic lift.

Figure 3:
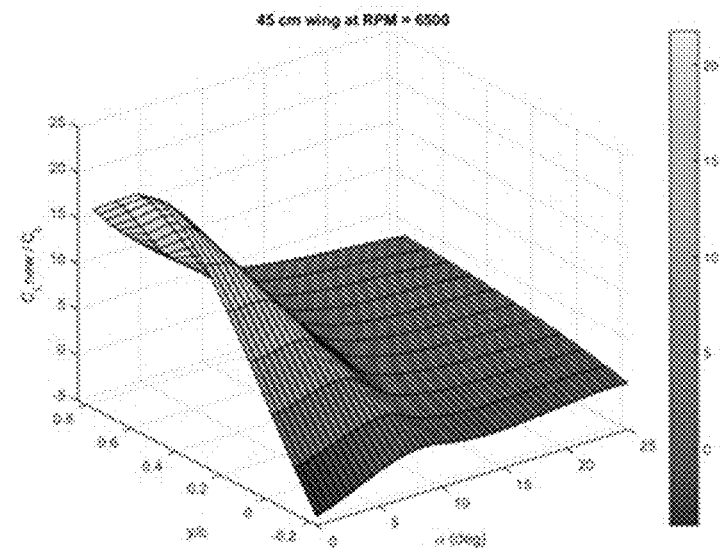
FIG. 3 illustrates a contour plot of the variation in the synergistic lift in a lift assembly with variation in the position of the rotor and angle of attack at a wing chord of 48 cm and rotor speed of 6500 RPM in an embodiment of the present subject matter.

FIG. 3 illustrates a contour plot of the variation in the synergistic lift in a lift assembly with variation in the position of the rotor and angle of attack at a wing chord of 48 cm and rotor speed of 6500 RPM in an embodiment of the present subject matter. It can be observed from the FIG. 3 that the total lift produced by the fixed wing 102 and running vertical rotor 118 combined system was more than the summation of lift produced by the fixed wing 102 and the vertical rotor 118 individually, leading to synergistic lift. Further, the ratio varies with the value of p and angle of attack at a wing chord of 48 cm and rotor speed of 6500 RPM, giving a maximum of about 20. A 20-fold increase shows the effectiveness of using an appropriately designed lift assembly with a running rotor during forward flight.

Hence to improve the lift of an aerial vehicle, a lift assembly 300 comprising a fixed wing 102 and at least a vertical rotor 118 positioned so as to increase the lift forces when operational is designed.

The lift assembly 300 is designed such that the variables of the lift assembly 300 are optimized. The value of p at which the lift assembly 300 produces maximum lift is dependent on the operational RPM of the vertical rotor 118, the chord 117, and the angle of attack 116. Hence the chord 117, the placement distance 112, operational RPM of the vertical rotor 118 and the angle of attack 116 are optimized to obtain a lift assembly 300 with increased lift force. To this end, CFD simulations are performed for a given chord 1 m, operational RPM of the vertical rotor at 70% throttle and the angle of attack 0 degree and the rotor being positioned at various locations around the wing along the x and y directions with a fixed z axis placement of 0 m. The lift force produced in N produced is presented in the table shown in FIG. 7.

The results in the table of FIG. 7 show that the optimum place for the positioning of the rotor is in the rear side of the wing for maximum lift. The lift is maximum when the rotor is right behind the wing at y=0, and the lift decreases as the absolute magnitude of the y location increases.

Another important factor estimated in the CFD studies is the drag gain given in the table shown in FIG. 8. The values show the reduction in drag and ultimately the reverse drag or thrust occurring because of the rotor interacting with the flow field of wing.

The positioning of the rotor upstream of the wing, near the leading edge provides a maximum reduction in drag and the force happens to be acting in the direction of thrust.

However, since the drag at the position of maximum lift is in the negative, the optimum positioning of the vertical rotor at the given set of parameters is at the rear of the wing. To choose the optimum position of the vertical rotor, the ratio of lift to drag force is estimated and summarized in the table shown in FIG. 9.

The ratio of lift to drag force is maximum at the rear of the wing. Hence the optimum positioning of the vertical rotor is at the rear of the wing.

Figure 4:
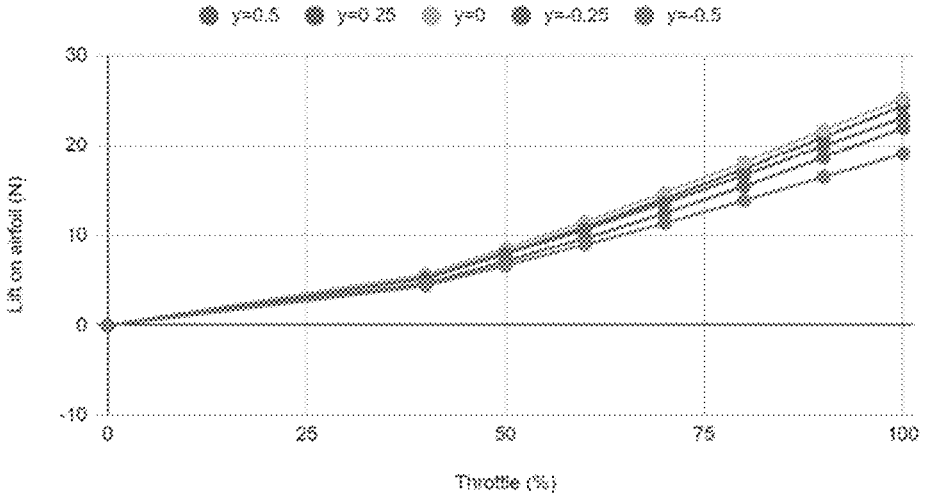
FIG. 4 illustrates the increase in lift, at varying placement distance of the rotor, as throttle is increased from 0 to 100% in an embodiment of the present subject matter.

FIG. 4 illustrates the increase in lift, at varying vertical distance of the rotor, as throttle is increased from 0 to 100% in an embodiment of the present subject matter. FIG. 4 indicates that when the throttle is increased from 0 to a 100%, the Lift increases in a linear manner.

Figure 5:
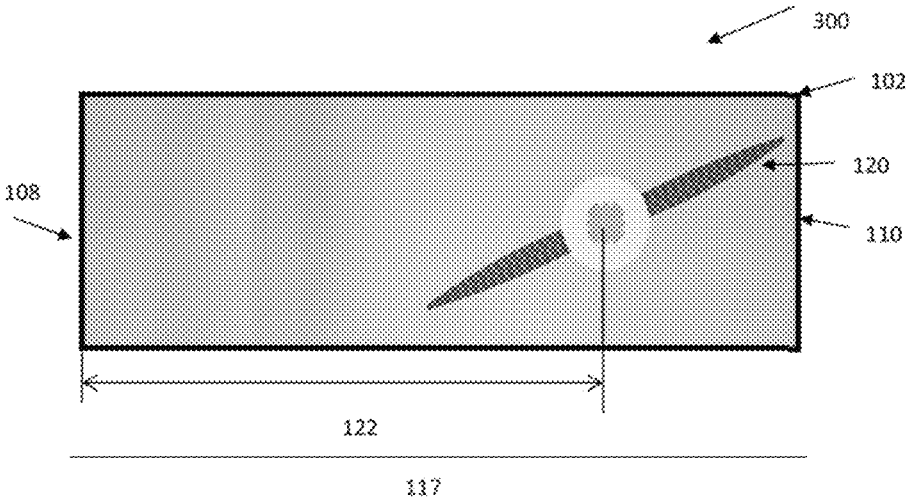
FIG. 5 illustrates a bottom view of a lift assembly in an embodiment of the present subject matter.

FIG. 5 illustrates a bottom view of a lift assembly (300) in an embodiment of the present subject matter. The fixed wing 102 is seen with the vertical rotor 118 positioned within the wing span of the fixed wing 102. The vertical rotor 118 is placed at the placement distance 122 from the leading edge 108.

Figure 6:
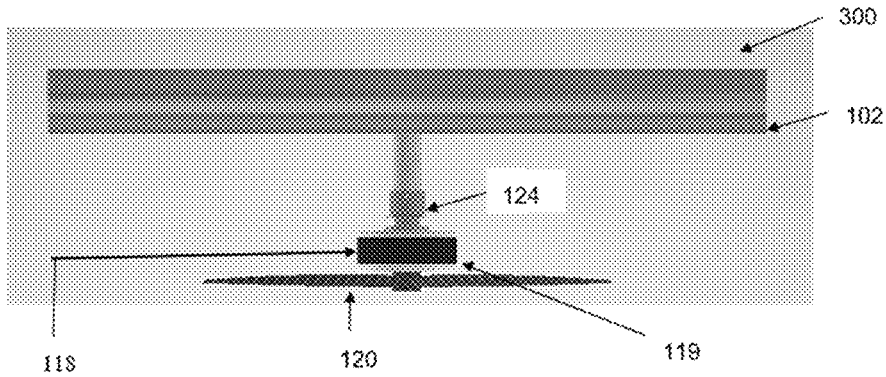
FIG. 6 illustrates a front view of a lift assembly in an embodiment of the present subject matter.

FIG. 6 illustrates a front view of a lift assembly (300) in an embodiment of the present subject matter. The lift assembly (300) further comprises an air frame (not shown in figure) which supports the fixed wing 102. The motor 119 is mounted onto the airframe using a connecting element 124. Thus, the vertical rotor 118 is attached to the air frame by the connecting element 124. The connecting element 124 may be a pod or a strut.

In an implementation of the present invention, a plurality of vertical rotors 118 may be positioned in the lift assembly 300 to provide an increased $C_L$.

In another implementation of the present invention, the vertical rotor 118 can be attached to an aerial vehicle with a pre-existing fixed wing. In this case, the angle of attack 116 is fixed and the value of p must be chosen appropriately to increase the lift coefficient. After the determination of p, the vertical rotor 118 is attached.

The key aspect of the present invention is the positioning of one or more rotors in the vicinity of the fixed wing. This positioning alters the flow field which in turn alters the pressure field around the fixed wing resulting in the increase in the lift produced by the fixed wing. The net effect is that the total lift produced by the combined wing-running rotors system is more than the sum of the individual lift that would be produced by the fixed wing and the stationary rotors. Accordingly, the fixed wing is not required to produce all the lift to balance the vehicle's weight during forward flight, and can be smaller than usual. A smaller wing reduces the drag experienced by the vehicle and makes the vehicle more compact.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

We claim:

1. A lift assembly (300) on an aerial vehicle, the lift assembly (300) comprising:
- a wing (102) comprising a leading edge (108), a trailing edge (110), and a chord (117); and
- a vertical rotor (118) having a vertical axis (121) disposed below the wing (102); wherein:
- a position of the vertical axis (121) is disposed at a placement distance (122) from the leading edge (108) of the wing (102) of at least a distance of the chord (117) at the trailing edge (110) of the wing (102);

- the vertical rotor (118) is operational during a forward flight of the aerial vehicle;
- the placement distance (122), defined as a distance between the leading edge (108) and the vertical axis (121) of the vertical rotor (118), is determined by an operational RPM of the vertical rotor (118), an angle of attack (116) of the wing (102), and the wing chord (117) of the wing (102);
- a combined effect of wing (102) and the vertical rotor (118) in operation provides a higher lift coefficient compared to a sum of a first lift coefficient of the wing (102) and a second lift coefficient of the vertical rotor (118) when operated individually.

2. The lift assembly (300) as claimed in claim 1, wherein a lift force increase on the aerial vehicle enables the wings (102) to be smaller and hence incur reduced drag for a given payload.

\* \* \* \* \*